United States Patent
Fulton et al.

(10) Patent No.: US 7,948,126 B2
(45) Date of Patent: May 24, 2011

(54) LIQUID COOLING SYSTEM OF AN ELECTRIC MACHINE

(75) Inventors: David A. Fulton, Anderson, IN (US); Pawel Tetela, Krakow (PL)

(73) Assignee: Remy Technologies, L.L.C., Pendleton, IN (US)

( * ) Notice: Subject to any disclaimer, the term of this patent is extended or adjusted under 35 U.S.C. 154(b) by 317 days.

(21) Appl. No.: 12/048,327

(22) Filed: Mar. 14, 2008

(65) Prior Publication Data

US 2008/0223557 A1    Sep. 18, 2008

Related U.S. Application Data

(60) Provisional application No. 60/895,241, filed on Mar. 16, 2007.

(51) Int. Cl.
*H02K 9/19* (2006.01)
(52) U.S. Cl. ............................................ 310/64; 310/54
(58) Field of Classification Search ...................... 310/54, 310/52, 64, 89, 55–59
See application file for complete search history.

(56) References Cited

U.S. PATENT DOCUMENTS

| | | | | |
|---|---|---|---|---|
| 3,525,001 A * | 8/1970 | Erickson | .......................... | 310/54 |
| 4,038,570 A * | 7/1977 | Durley, III | .................... | 310/318 |
| 5,293,089 A * | 3/1994 | Frister | .............................. | 310/54 |
| 5,859,482 A * | 1/1999 | Crowell et al. | .................. | 310/58 |
| 5,923,108 A * | 7/1999 | Matake et al. | .................. | 310/89 |
| 6,100,615 A * | 8/2000 | Birkestrand | ................ | 310/75 C |
| 6,160,332 A * | 12/2000 | Tsuruhara | ........................ | 310/54 |
| 6,445,095 B1 * | 9/2002 | Liang et al. | ..................... | 310/64 |
| 2005/0023266 A1 * | 2/2005 | Ueno et al. | ..................... | 219/390 |
| 2007/0145836 A1 * | 6/2007 | Bostwick | ........................ | 310/64 |

* cited by examiner

*Primary Examiner* — Quyen Leung
*Assistant Examiner* — Naishadh N Desai
(74) *Attorney, Agent, or Firm* — Cantor Colburn LLP

(57) ABSTRACT

Disclosed is a liquid cooling system for an electric machine including a frame heat conductively attachable to a stator of an electric machine. The liquid cooling system further includes a cover mechanically attached to the frame and fluidly sealed to the frame, the cover and frame defining a cavity therebetween. The cover includes at least one protrusion extending substantially a distance between the cover and the frame. A method for constructing a liquid is also provided. The method includes forming at least one protrusion in the cover and structurally affixing the cover to the frame. The cover is fluidly sealed to the frame.

15 Claims, 7 Drawing Sheets

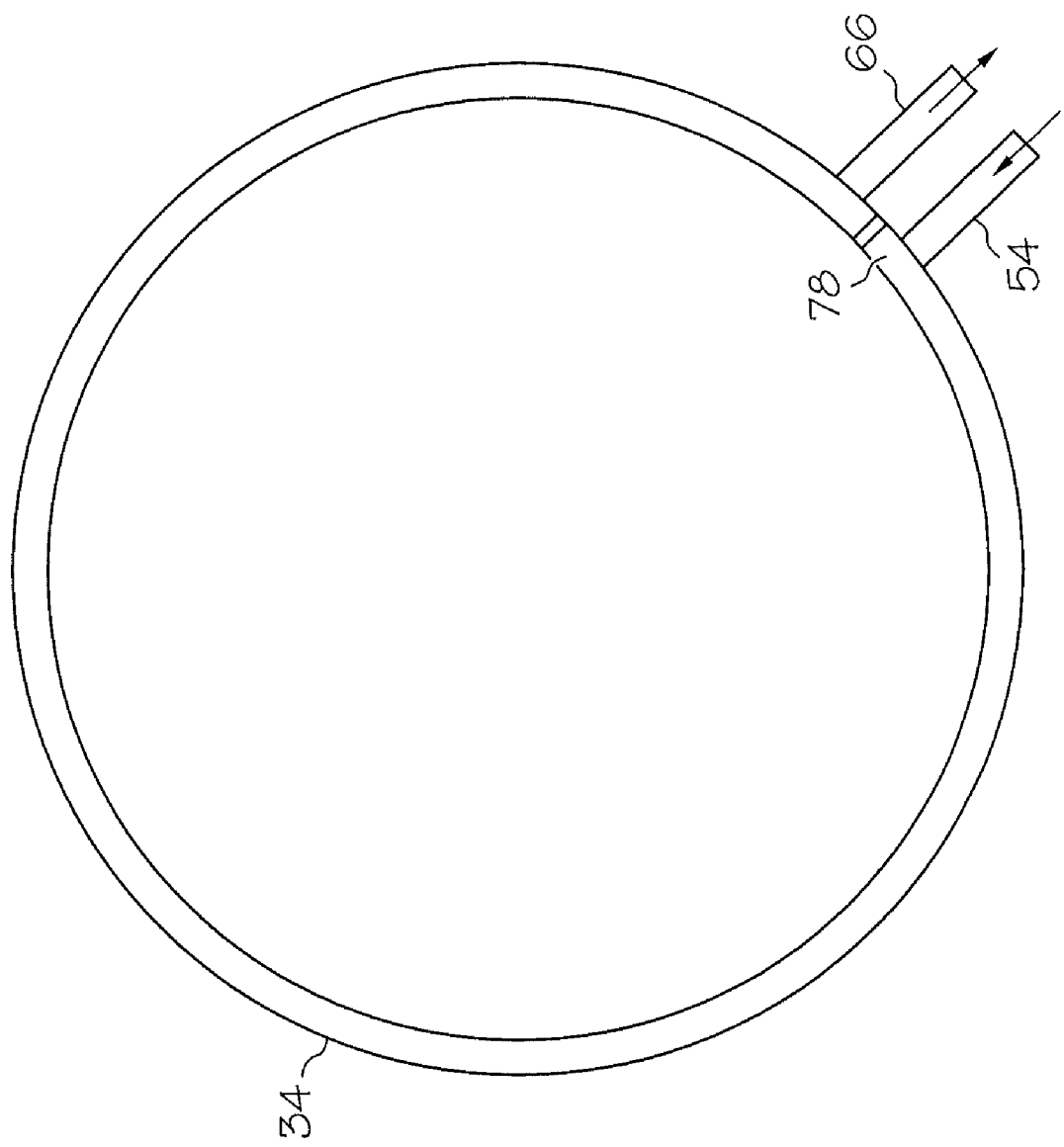

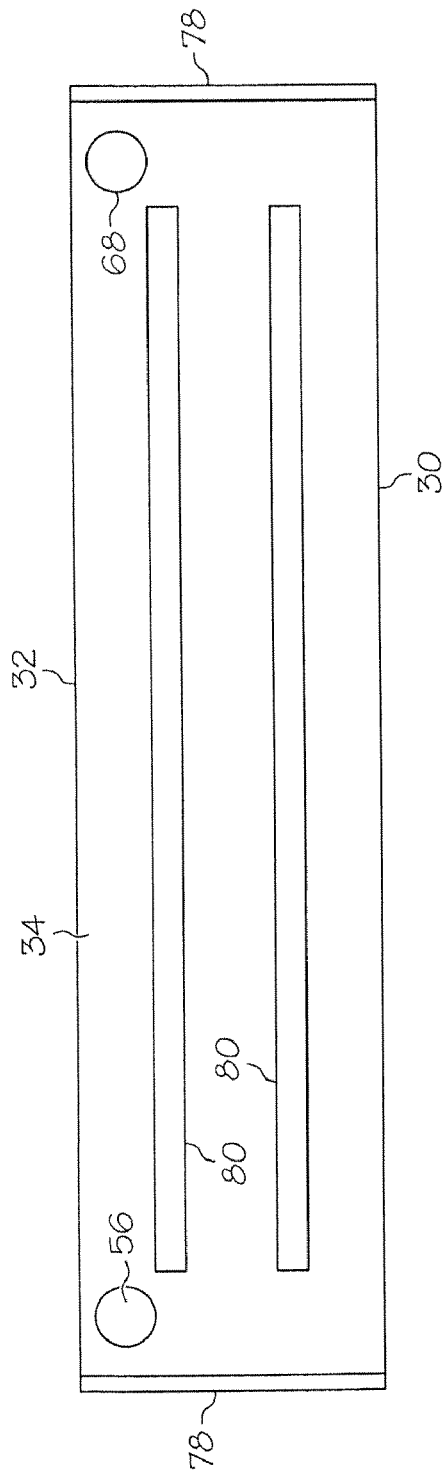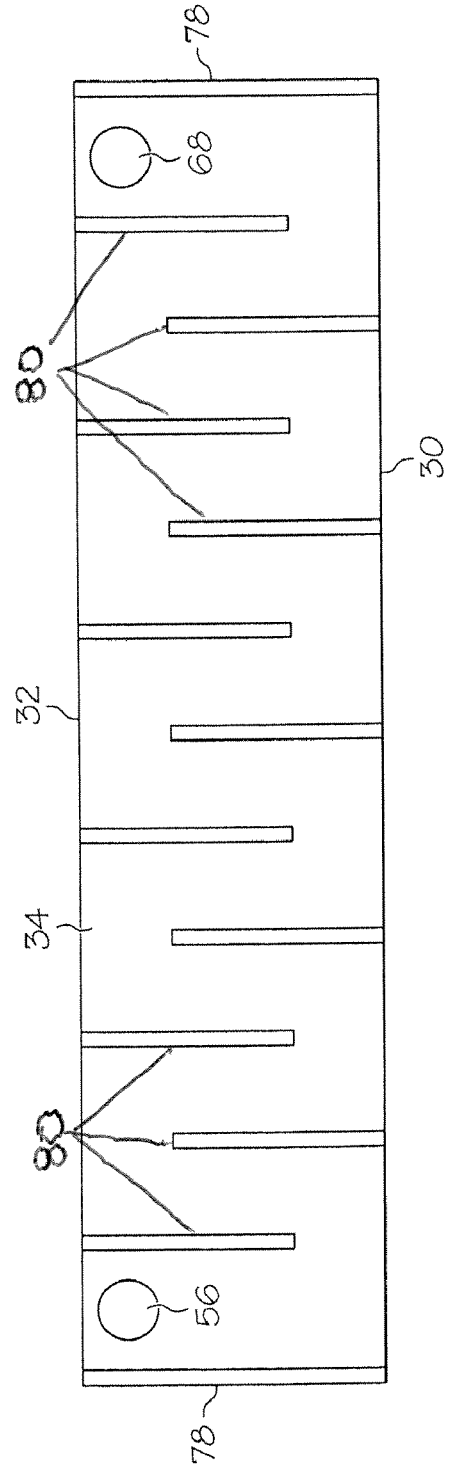

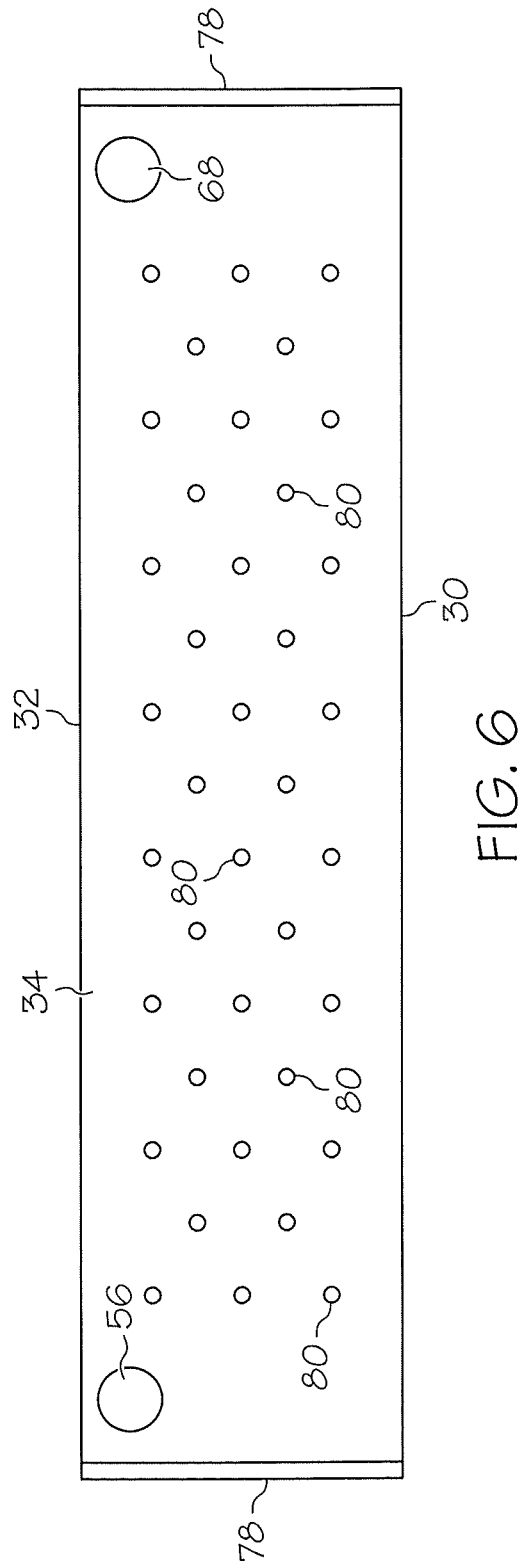
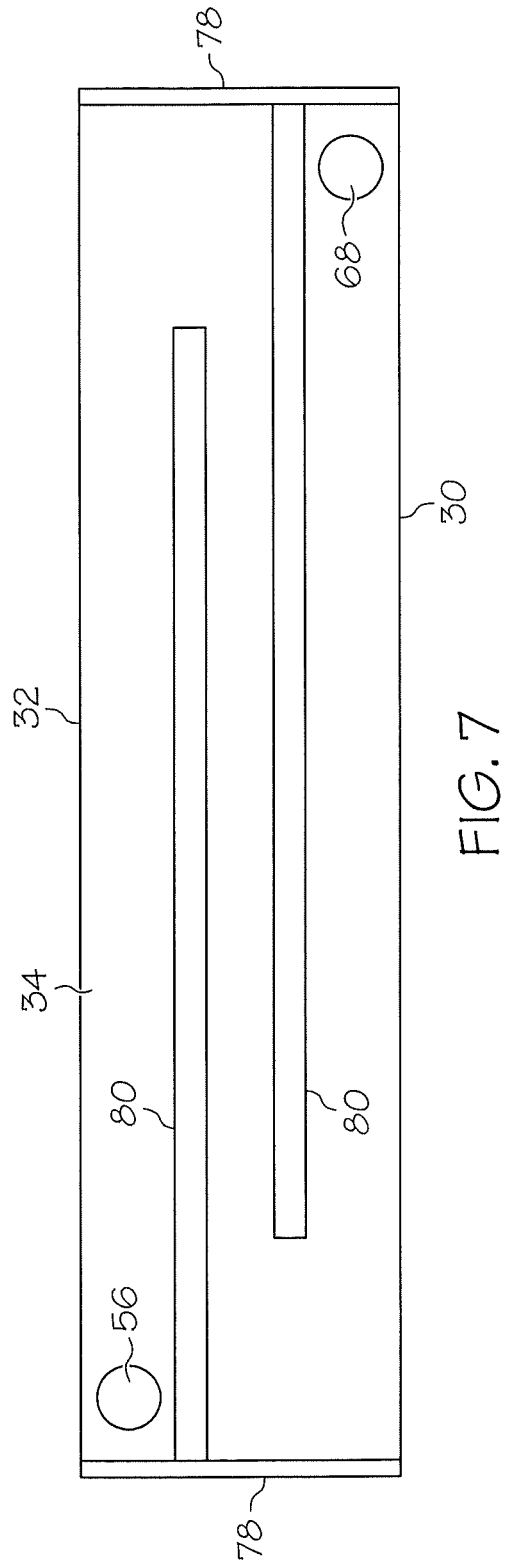
FIG. 6
FIG. 7

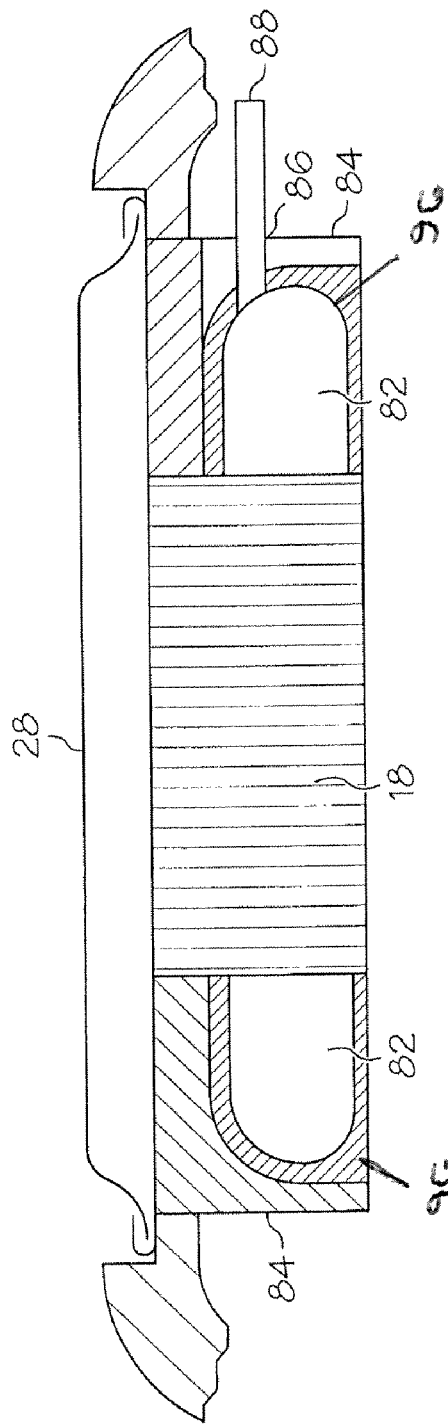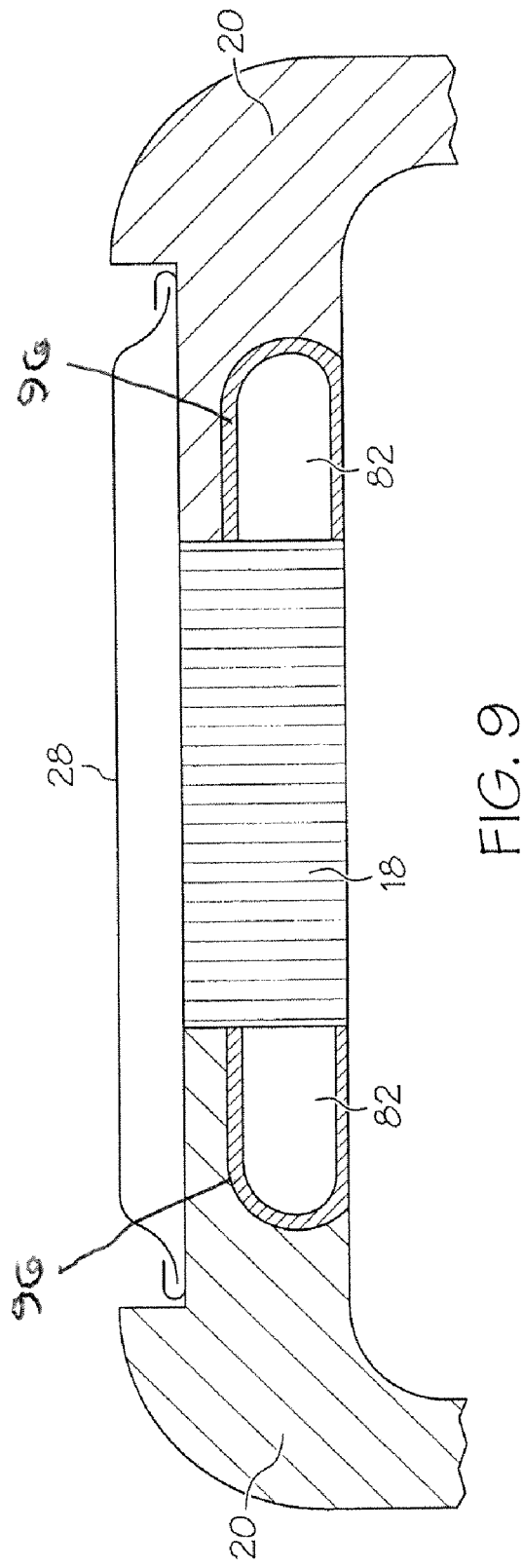

LIQUID COOLING SYSTEM OF AN ELECTRIC MACHINE

CROSS REFERENCE TO RELATED APPLICATION

This application is a non-provisional application of U.S. Ser. No. 60/895,241, filed Mar. 16, 2007, the contents of which are incorporated by reference herein in their entirety.

BACKGROUND OF THE INVENTION

The present invention relates generally to electric machines. More specifically, this invention relates to an improved liquid cooling system for an electric machine.

As higher voltage and higher power electric machines are utilized in vehicles and the like, a problem regarding the fact that such electric machines produce an increasing amount of heat is realized. Excess heat must be dissipated to preserve the reliability and efficiency of the electric machine. In many applications, the amount of heat is great enough that a liquid cooling system is used to dissipate heat from the electric machine.

Prior liquid cooling systems have utilized a cooling jacket in thermal contact with the machine, and a fluid is circulated through the cooling jacket to transfer heat from the jacket into the fluid, which then is carried from the cooling jacket to a heat loss device. One type of cooling jacket is a double-walled cast aluminum cooling jacket. The constraints of casting design and fabrication result in a cooling jacket of substantial thickness. Since the overall package size of the electric machine is usually restricted by available space in, for example, a vehicle, the cast cooling jacket thickness is disadvantageous because it limits a space available for the electric machine stator and thereby limits the performance of the electric machine.

A second type of cooling jacket, a brazed steel assembly, has been used in an effort to reduce the cooling jacket thickness. The brazed joints, however, have low mechanical strength and are vulnerable to cracking under vibration, which will result in a fluid leak and potential failure of the electric machine. The brazed cooling jackets are less efficient at heat transfer because the interior of the jackets have a decreased surface area simply due to a smaller diametrical dimension of the outer surface of the cooling jacket as compared to that dimension of the cast jacket, which as noted must be thicker. Additionally, because the interior walls of the brazed cooling jackets are smooth compared to the cast cooling jacket, the result is a less turbulent flow of the cooling fluid through the jacket, and consequently less effective cooling.

Although the normal systems do indeed reduce operating temperatures of electric machines, the art will nevertheless well receive alternative configurations and methods that improve cooling ability, reduce required footprint, reduce cost, or improve longevity.

SUMMARY OF THE INVENTION

The present invention solves the aforementioned problems by providing a liquid cooling system for an electric machine including a frame heat conductively attachable to a stator of an electric machine. The liquid cooling system further includes a cover mechanically attached to the frame and fluidly sealed to the frame, the cover and frame defining a cavity therebetween. The cover includes at least one protrusion extending substantially a distance between the cover and the frame.

A method for constructing a liquid is also provided. The method includes forming at least one protrusion in the cover and structurally affixing the cover to the frame. The cover is fluidly sealed to the frame.

DESCRIPTION OF THE DRAWINGS

The above, as well as other advantages of the present invention, will become readily apparent to those skilled in the art from the following detailed description of preferred embodiments when considered in the light of the accompanying drawings in which:

FIG. 3 is a schematic axial view of a cavity of the liquid cooling system of FIG. 2;

FIG. 4 is a plan view of a cavity illustrating a first example of a protrusion configuration;

FIG. 5 is a plan view of a cavity illustrating a second example of a protrusion configuration;

FIG. 6 is a plan view of a cavity illustrating a third example of a protrusion configuration;

FIG. 7 is a plan view of a cavity illustrating a fourth example of a protrusion configuration;

FIG. 8 is a view of a first example of an end turn heat transfer enhancement;

FIG. 9 is a view of a second example of an end turn heat transfer enhancement.

DETAILED DESCRIPTION OF THE INVENTION

Figure 1:
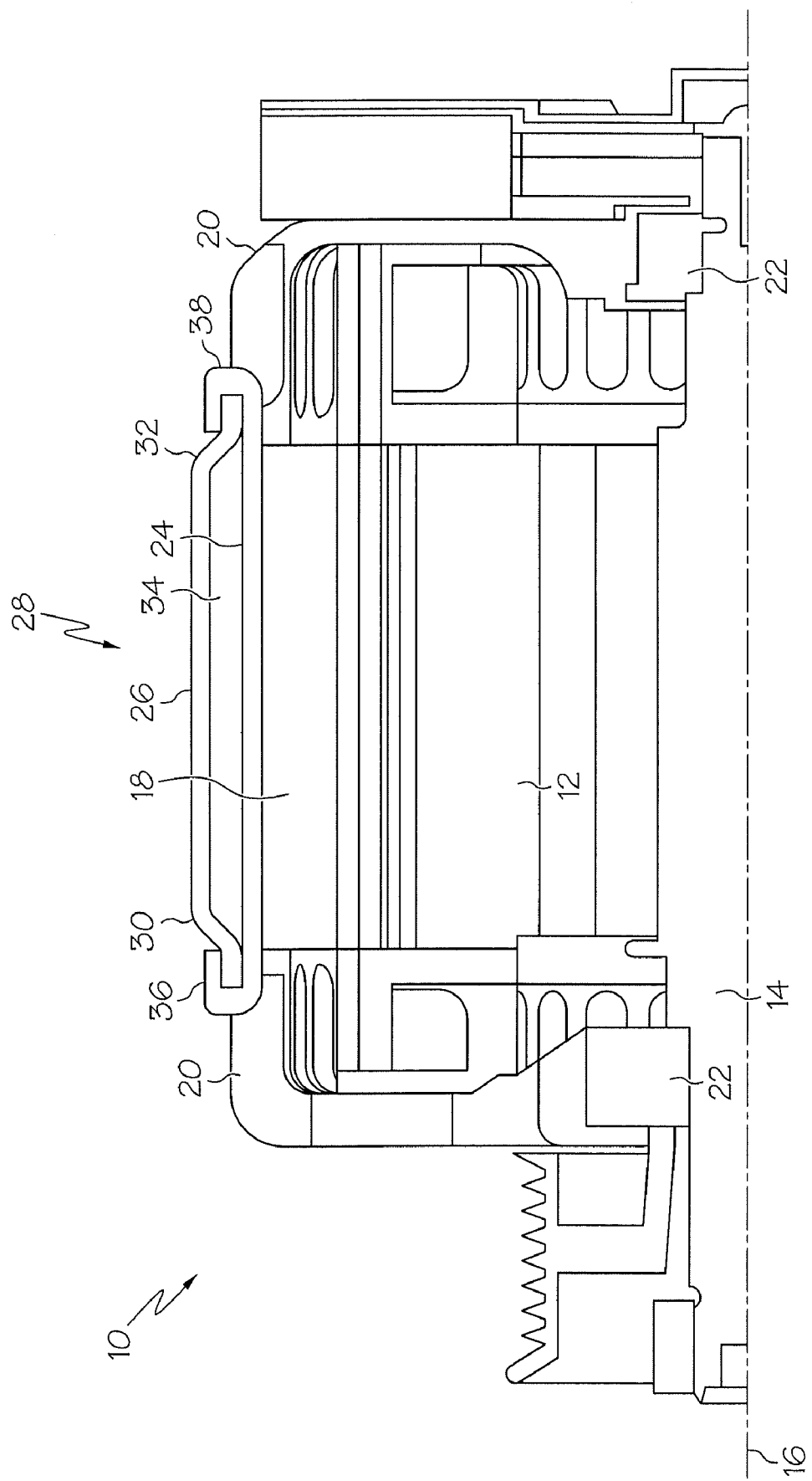
FIG. 1 partial cross-sectional view of an electric machine with an improved liquid cooling system.

Shown in FIG. 1 is a fluid-cooled electric machine 10. The type of electric machine shown in FIG. 1 is a belt-driven alternator starter (BAS), but applications of this invention to other electric machines such as generators and/or alternators is contemplated. Electric machine 10 includes a rotor 12 disposed circumferentially about a shaft 14, and rotable with the shaft 14 about a rotor axis 16. Extending axially along the rotor axis 16 and surrounding the rotor 12 is a stator 18. The stator 18 comprises a plurality of conductive windings (not shown) disposed on a stator core (not shown). Enclosing the electric machine 10 at each axial end is an end bell 20, the shaft 14 extending through a bell hole 22 therein.

Figure 2:
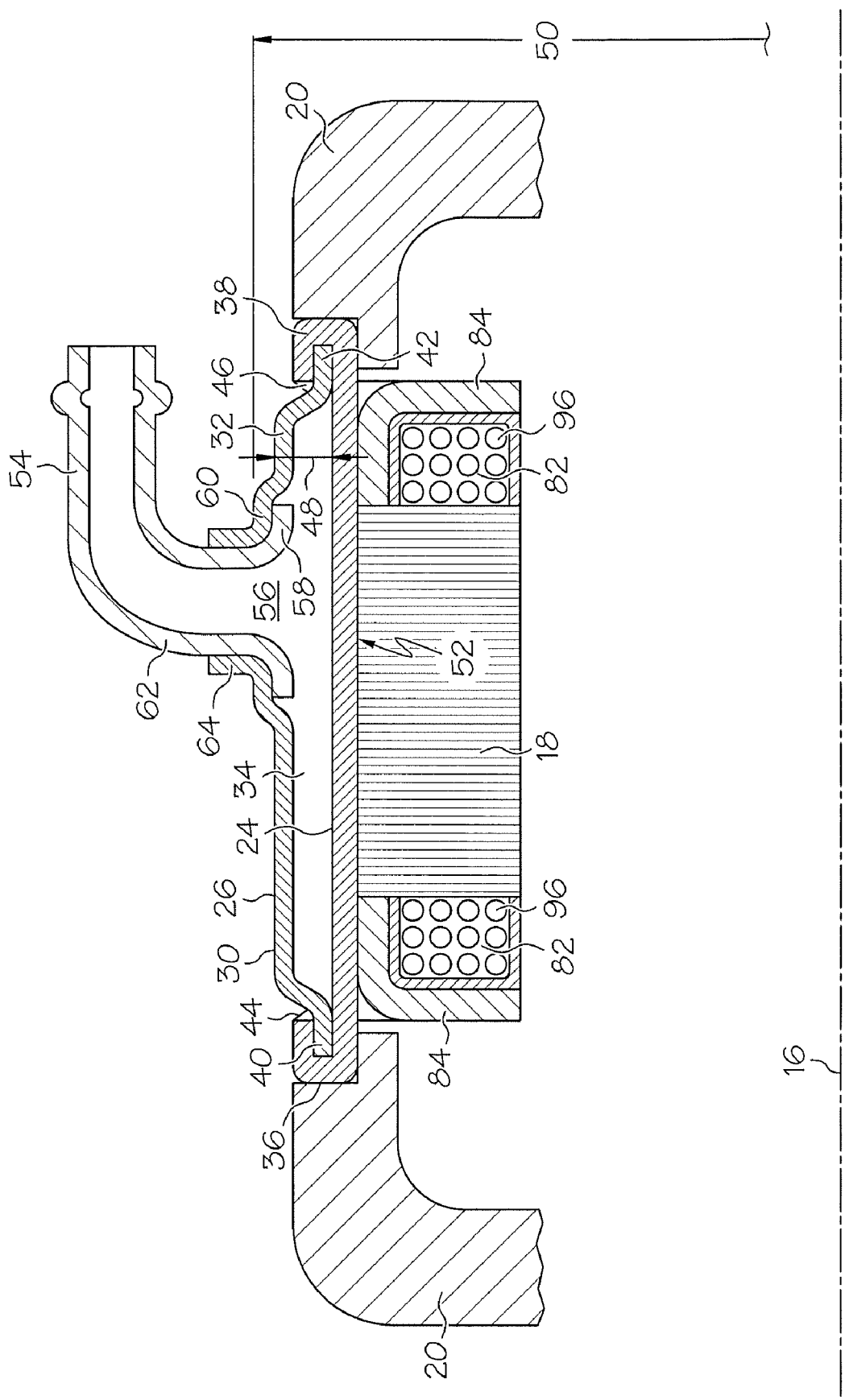
FIG. 2 is an enlarged view of the liquid cooling system of the electric machine of FIG. 1.

A frame 24 is placed entirely around an outer surface of the stator 18 to maximize thermal contact between the frame 24 and the stator 18. In one embodiment, this is accomplished by shrink-fitting the frame 24 to the stator 18, but other means are contemplated within the scope of this invention. A cover 26 is then affixed to the frame 24 defining a cooling jacket 28. In one embodiment, the cover 26 includes a forward cover flange 30 and an aft cover flange 32 that extend inwardly toward the frame 24 such that when the cover 26 is affixed to the frame 24, a cavity 34 is defined between the frame 24 and the cover 26. In the embodiment shown in FIG. 2, a mechanical or thermoset structural attachment means as well as a fluid sealing means are used to affix the cover 26 to the frame 24. In one embodiment, welding, rolling, and brazing are used to affix the cover 26 to the frame 24 to ensure a leak-free cavity 34. It is to be understood that while welding, rolling, and brazing are specifically identified, it is also possible to omit the welding step. Further, welding may be substituted for by other affixation means that effectively remove mechanical stress from the seal means. Too, the seal means may be other than by brazing while remaining within the scope of the invention. The frame 24 includes a forward frame flange 36 and an aft frame flange 38 that extend circumferentially around the frame 24. Referring now to FIG. 2, the forward cover flange 30 is affixed to the frame 24, such as by welding, for example, at a forward interface 40, and similarly, the aft cover flange 32 is affixed to the frame 24, such as by welding, for example, at an aft interface 42. Such welding is to remove structural strain the components for sealing purposes and may be fully welded or spot welded. It is noted that since a rolling or folding process is also employed, it is expected that economy is served by merely spot welding. Indeed in some embodiments, welding is dispensed with altogether. The rolling or folding operation is similar to that employed commercially for cans. More specifically, the forward frame flange 36 is rolled or folded over the forward cover flange 30, and the aft frame flange 38 is rolled or folded over the aft cover flange 32.

Additionally, a fluid seal is formed between the cover 26 and the frame 24 at a forward edge 44 and at an aft edge 46. To accomplish formation of the fluid seal, a brazing material or other sealing material, heat activated or not, is put in place during the rolling or folding operation. If the material is heat activated, then heat is applied. In one embodiment, heat is supplied via an induction heating arrangement to reduce peripheral heating of the cooling jacket 28. It is to be appreciated that one or the other of the edges 44, 46 may be brazed or both may be brazed. This joint configuration helps ensure the existence of a leak free cavity 34 between the frame 24 and the cover 26.

The cover 26 and the frame 24 in an exemplary embodiment are made from steel although it is to be appreciated that other materials may be substituted. When steel is employed, properties such as strength and stiffness are enhanced while maintaining a low cost. In some embodiments the steel may be coated with a corrosion inhibiting substance such as, for example, an aluminum coating to enhance corrosion resistance. Utilizing steel allows a thickness 48 of the cooling jacket 28 to be approximately 50% less than a similar cooling jacket formed from cast aluminum. Because a maximum diameter 50 of the machine 10 may be restricted by application, minimizing the thickness 48 allows for maximization of a stator diameter 52 of the stator 18 which subsequently can be translated into an increase in torque that can be produced by the electric machine 10. For example, if the maximum diameter 50 is 172 mm, the thickness 48 of a steel cooling jacket 28 would be approximately 6 mm which accommodate a stator 18 with a stator diameter 52 of 160 mm. A cast aluminum jacket, however, would be approximately 14 mm thick which will accommodate a stator 18 with a stator diameter of 144 mm. This difference in stator diameters 52, results in a torque advantage of 20-25% for the electric machine 10 produced with the steel cooling jacket 28.

Providing for the introduction of cooling fluid into the cavity 34, an inlet connection 54 is disposed at an inlet hole 56 in the cover 26, and is affixed to the cover 26 in a way similar to that described above. A connection flange 58 of the inlet connection 54 is affixed to an inlet hole boss 60 such as by welding, for example. Additionally, an inlet connection neck 62 is sealed to an inlet hole flange 64. In one embodiment, inlet connection neck 62 is brazed to the inlet hole flange 64. It is to be appreciated that one or the other of the inlet connection neck 62 and inlet hole flange 64 may be brazed or both may be brazed. As above, this configuration helps ensure that the joint between the inlet connection 54 and the cover 26 is leak free.

Cooling fluid is urged through the inlet connection 54 and into the cavity 34, circulating through the cavity 34. As the fluid circulates, it conducts heat from the cooling jacket 28 which had conducted the heat from the stator 18 due to the frame 24 being in thermal contact with the stator 18. The warmed cooling fluid exits the cavity 34 through an outlet connection 66. As shown in FIG. 3, the outlet connection 66 is similarly disposed and sealed in an outlet hole 68 in the cover 26, and in one embodiment is circumferentially adjacent to the inlet connection 54. A connection flange 70 of the outlet connection 66 is affixed to an outlet hole boss 72 such as by welding, for example. Additionally, an outlet connection neck 74 is, in one embodiment, brazed to an outlet hole flange 76. It is to be appreciated that one or the other of the outlet connection neck 74 and outlet hole flange 76 may be, for example, brazed or both may be, for example, brazed. In one embodiment, a barrier plate 78 is disposed in the cavity 34 blocking the cavity 34 between the inlet hole 56 and the outlet hole 68 to encourage 360 degree flow of cooling fluid around a circumference of the cavity 34.

In some embodiments, at least one protrusion 80 disposed in the cover 26 extends substantially a distance between the cover 26 and the frame 24. In some embodiments, the protrusions 80 are drawn structures, meaning that while a protrusion is formed on one of an inner surface or an outer surface of the frame or the cover, a depression is formed on the other of the inner surface or the outer surface of the frame or the cover. For simplicity in the explanation of the invention in this application, the structures will be referred to as protrusions. It is to be understood that the type of "protrusion" can be any of the foregoing or equivalents thereof. The protrusions 80, examples of which are shown in FIGS. 4-7, define a tortuous path for flow of cooling fluid through the cavity 34. The protrusions 80 increase a surface area for dissipating heat from the stator 18 into the fluid and increase turbulence in the cavity 34 thereby decreasing convection resistance. The protrusions 80 additionally provide structural support for cover 26, and increase stiffness of the cover 26 to protect it from potential handling damage. The protrusions 80 may extend from one or the other of the cover 26 and the frame 24, or the protrusions 80 may extend from both the cover 26 and the frame 24 (although it is noted that the shrink fit used to secure the frame 24 to the stator 18 may be enhanced if protrusions are not formed in the frame 24 so that the frame 24 retains the greatest tensile integrity that the material from which the frame 24 is made affords), and extend at least partially across the cavity 34. The protrusions 80 may be formed in the cover 26 and/or the frame 24 by for example, stamping, or alternatively by affixing the protrusions 80 to the cover 26 and/or the frame 24 by, for example, welding. When the cover 26 is then affixed to the frame 24 as described above, a labyrinthian flow path is defined in the cavity 34 as shown in FIGS. 4-7.

An example of a protrusion 80 configuration is shown in FIG. 4. The protrusions 80 in this configuration are elongated structures disposed such that the elongation is in a substantially circumferential direction between the inlet hole 56 and the outlet hole 68 and extend into the cavity 34. The protrusions 80 may be arranged in rows in an axial disposed between the forward cover flange 30 and the aft cover flange 32.

A second example of a protrusion 80 configuration is shown in FIG. 5. In the second example, the protrusions 80 are elongated structures disposed such that the elongation is in a substantially axial direction between the forward cover flange 30 and the aft cover flange 32 and extend into the cavity 34. The protrusions 80 alternately extend from the forward cover flange 30 and the aft cover flange 32. The result is a labyrinthian flow path for the cooling fluid.

FIG. 6 illustrates a third example of a protrusion 80 configuration. In FIG. 6, the protrusions 80 comprise an array of structures with substantially circular cross sections arranged in the cavity 34. FIG. 7 illustrate yet another example of an arrangement of protrusions 80. In FIG. 7, the protrusions 80 are elongated structures disposed such that the elongation is in a substantially circumferential direction between the inlet hole 56 and the outlet hole 68 and extend into the cavity 34. The protrusions 80 alternately extend from either side of the barrier plate 78. This creates a labyrinthian flow path for the cooling fluid through the circumferentially arranged protrusions 80. It will be appreciated that the example protrusion 80 configurations other than those described above may be employed in the cavity 34.

Figure 10:
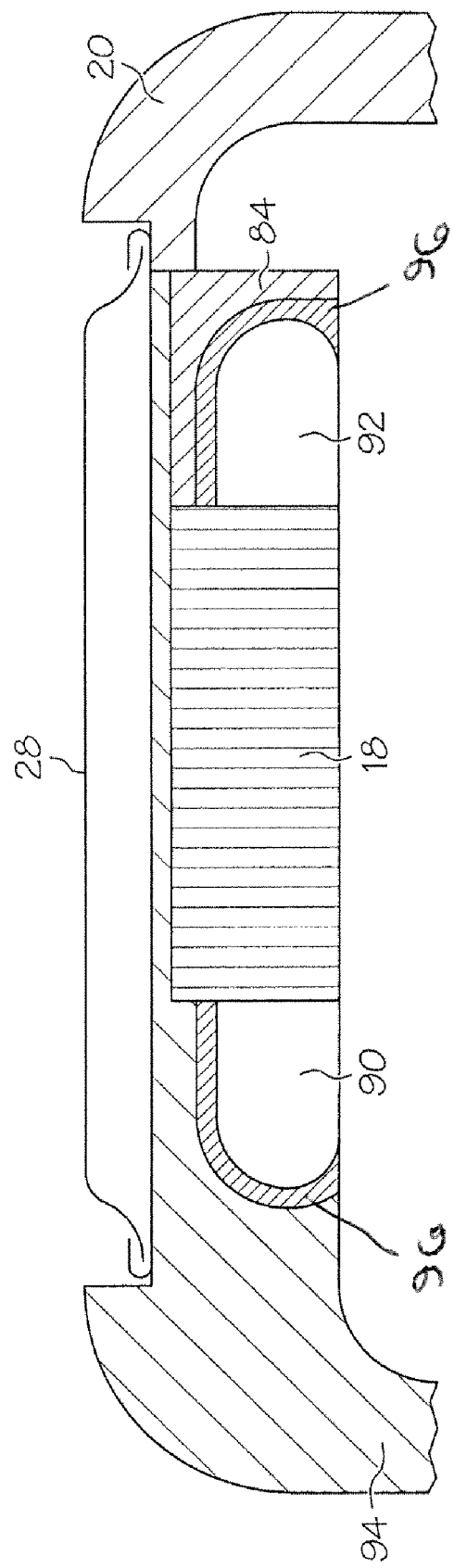
FIG. 10 is a view of a third example of a heat transfer enhancement.

Referring now to FIGS. 8-10, some embodiments include features to enhance heat transfer of stator end turns 82 to the cooling jacket 28. In FIG. 8, the end turns 82 are encapsulated in, for example, a potting compound or plastic or other material which forms a potting layer 96. A ring 84 made from a heat conductive material, for example, steel or aluminum, is fit onto the potting layer 96. It will be appreciated that other materials may be employed for the ring 84. The ring 84 may be contoured to better fit a shape of the potting layer 96 thus displacing substantially all of the air between the potting layer 96 and the ring 84 thus increasing thermal contact between the ring 84 and the potting layer 96. Further the ring 84 may include slots or holes 86 to allow egress of lead wires 88 or the like. Utilization of the rings 84 reduces the amount of potting compound used, and increases the effectiveness of heat conduction from the end turns 82 into the cooling jacket 28.

FIG. 9 illustrates a second example. In FIG. 9, the end turns 82 are encapsulated, resulting in a potting layer 96, and end bells 20 are fitted to the potting layer 96. The end bells 20 may be contoured to better fit a shape of the potting layer 96 displacing substantially all of the air between the end bells 20 and the potting layer 96 thus increasing the thermal contact between end bells 20 and potting layer 96. Additionally, a layer of thermal grease, sealant, or other thermally conductive compound may be interspersed between the potting layer 96 and the end bells 20.

A third example is illustrated in FIG. 10. In this example, the stator end turns 90 and 92 are encapsulated as described above. A first end bell 94 is fitted to first potting layer 96, and a ring 84 is fitted to second potting layer 96. The first end bell 94 and/or the ring 84 may be contoured to provide increased thermal contact with the potting layers 96.

While embodiments of the invention have been described above, it will be understood that those skilled in the art, both now and in the future, may make various improvements and enhancements which fall within the scope of the claims which follow. These claims should be construed to maintain the proper protection for the invention first described.

What is claimed is:

1. A liquid cooling system for an electric machine comprising:
    a heat frame conductively attachable to a stator of an electric machine;
    a cover mechanically attached to the frame and fluidly sealed to the frame, the cover and frame defining a cavity therebetween, the frame having at least one flange receptive of the cover to secure the cover to the frame; and
    at least one protrusion in the cover extending substantially a distance between the cover and the frame.

2. The liquid cooling system of claim 1 wherein the frame and cover are thin wall structures.

3. The liquid cooling system of claim 1 wherein the at least one protrusion increases turbulence in fluid flowing in the cavity.

4. The liquid cooling system of claim 1 wherein the at least one protrusion increases surface area of the cavity.

5. The liquid cooling system of claim 1 wherein the at least one protrusion extends from the cover and is attached to the frame.

6. The liquid cooling system of claim 5 wherein at least one protrusion is attached to the frame by welding.

7. The liquid cooling system of claim 1 wherein the at least one protrusion is a circumferentially elongated structure.

8. The liquid cooling system of claim 1 wherein the at least one protrusion is an axially elongated structure.

9. The liquid cooling system of claim 1 wherein a thickness of a cooling jacket defined by the heat frame with the cover mechanically attached thereto is approximately 6 mm.

10. The liquid cooling system of claim 1 wherein the stator includes end turns encapsulated in a potting layer.

11. The liquid cooling system of claim 10 wherein one or more conductive rings are placed in thermal contact with the potting layer and with the frame providing thermal conductivity therebetween.

12. The liquid cooling system of claim 10 wherein an end bell of the electric machine is placed in thermal contact with the potting layer and with the frame providing thermal conductivity therebetween.

13. The liquid cooling system of claim 1 wherein the liquid cooling system is constructed of steel.

14. The liquid cooling system of claim 13 wherein the liquid cooling system includes a coating to increase corrosion resistance.

15. The liquid cooling system of claim 14 wherein the coating is an aluminum coating.

* * * * *